Patented May 19, 1936

2,041,298

UNITED STATES PATENT OFFICE 2,041,298

INSECTICIDE MATERIAL AND PROCESS OF MAKING THE SAME

Warren Moore, Richmond, Va., assignor to Tobacco By-Products and Chemical Corporation, Louisville, Ky., a corporation of Delaware No Drawing. Application December 28, 1932, Serial No. 649,149

9 Claims. (Cl. 167—31)

This invention relates to a new insecticide material and process of making the same. The insecticide material is suitable as a stomach poison but in addition has shown great efficacy as a contact poison.

The object of the invention is to provide an insecticide material utilizing the insecticidal properties of alkaloids toxic to insects, while at the same time overcoming the solubility and volatility of such alkaloids.

With this general object in view, and some others which will be obvious to those skilled in the art from the description hereinafter, the invention broadly considered consists in an insectide material comprising the reaction products of a condensible phenolic compound and an aldehyde in which an alkaloid toxic to insects is included, and also consists in the process of making such an insecticide material.

There are a number of phenolic compounds which are suitable for the present purpose. Among these are the compounds which contain the hydroxyl group attached directly to the benzene nucleus or to the condensed benzene nuclei, for example, cresol, pyrogallol, beta-naphthol, and resorcinol. The latter is particularly advantageous, and the description hereinafter will refer specifically to a process employing it, and to the resultant product, it being understood that other phenolic compounds may be used instead of resorcinol.

It is known that there are several aldehydes which will bring about the condensation of the said phenolic compounds in the presence of a suitable catalyst, but the aldehydes most usually employed and particularly suitable for carrying out the process of the present invention are paraldehyde and formaldehyde, the latter being generally employed in its commercial form known as formalin.

The group of alkaloids toxic to insects include pyridins, anabasines and nicotine. The particular anabasine known as beta-pyridyl-alpha-piperidine has a high toxicity and may be employed with excellent effect in carrying out the present invention. It has been found, however, that nicotine is best.

It is to be noted that in the prior art practice of forming condensation products from phenolic compounds and formaldehyde, it is necessary or advisable to employ a catalyst for the reaction, such a catalyst being either an acid or a base and more generally the latter, one such catalyst being hexamethylene tetramine. In the present process the alkaloid on account of its basic properties performs the function of a catalyzer and at the same time is included in some way in the condensation product and still maintains its toxic properties.

A specific example of one way of carrying out the process in accordance with the invention is as follows:

Twenty parts by weight of crude resorcinol, are dissolved in 100 parts by weight of water. Separately, 7 parts by weight of free nicotine of 95% strength are dissolved in 140 parts by weight of water. The two solutions are heated to 90° C. and poured together into a vessel containing 15 parts of 37% commercial formalin. The temperature of the reaction mixture is maintained at or slightly above 85° C. for one hour. During this step of the process condensation reaction takes place. The mixture is allowed to cool and then the solids are separated from the liquid in any suitable way, but most advantageously, in large scale production, by filtration in a filter press.

The resultant filter cake may be dispersed in water to form a solution for spraying plants, or the cake may be dried and then disintegrated to form a dust insecticide material. If preferred as a dust and marketed in its dust form it may be applied to plants as dust insecticide, or it may be used by the consumer to form a liquid spray insecticide, if put in the spray tank with water and thoroughly agitated by the usual tank agitator.

Whatever the formula used for the proportions of materials, in carrying out the process, it is most advantageous to have the resorcinol and the formaldehyde in about equimolecular proportions, and to combine with these a quantity of alkaloid, particularly nicotine, equal to about 30% of the weight of the resorcinol used.

Where there is any difficulty in the separation of the phenolic condensation products from the accompanying liquid, it is possible to expedite the throwing out of the solids by using a small quantity of sodium sulfate prior to filtration. In general practice, the sodium sulfate used will be about 5% of the total weight of the mixed solutions.

The filter cake, after proper drying, is readily disintegrated into a fine, bulky powder which is ideal for use as a dust insecticide.

If, however, the material is to be applied as a suspension in a liquid spray, it may be more advantageous to ship it to the consumer as a paste in water, in which case the pressed filter cake is at once mixed in water, because in its undried state it is readily wet with water and can be easily disintegrated. The disintegrated flocculent material consists of solid particles which carry from 20 to 25% of the alkaloid, the remainder of the material being the reaction products of the phenolic compound and aldehyde employed in carrying out the reaction. Whether any of the alkaloid, for example nicotine, is truly chemically combined with the condensation product, or whether all the alkaloid is merely occluded or adsorbed, has not so far been determined. In any event the resultant solid particles carry the alkaloid in such form that it has lost none of its toxic properties, but on the other hand it cannot be dissolved out, or at least not to any appreciable extent by water, and its volatility is greatly reduced so that when a plant is treated with a dust of this kind, or a liquid suspension of the particles, the toxicity of the insecticide on the plant is retained much longer than with any alkaloid material heretofore employed. Furthermore, the properties of the new article are such that it can be caused to adhere well to the foliage and fruit of apple and peach trees. It has been found that the Oriental fruit moth was unable or unwilling to enter peach fruit coated with this new insecticide made from nicotine resorcinol and formaldehyde. Tests of this material against the codling moth have shown very satisfactory results.

The product can be used to coat fruit, vegetables, flowers and foliage as a protection against insects, and has the great advantage that it will hold its toxic properties for a considerable length of time and will adhere well to the plant, especially when applied in a spray containing some oil. As a contact insecticide it is very advantageous although only slightly volatile, since it is possible to apply a durable coating to the plant, and when any susceptible insects move onto the coating they are killed or repelled by the absorption of the alkaloid from the material in contact with them.

What is claimed is:

1. An insecticide comprising the reaction products of an alkaloid toxic to insects, a dihydroxybenzene and an aldehyde, said insecticide being substantially insoluble in water.

2. The method of producing an insecticide material comprising an alkaloid toxic to insects and the reaction products of a phenolic compound and an aldehyde, which consists in simultaneously bringing together a solution of a condensible phenolic compound, a solution of an aldehyde, and an alkaloid toxic to insects at a temperature not less than about 80° C. and maintaining the mixture above said temperature until condensation takes place, and then separating the solids from the liquids.

3. The method of producing an insecticide material comprising nicotine and the reaction products of resorcinol compound and formaldehyde, which consists in simultaneously bringing together a solution of resorcinol, a solution of formaldehyde, and a solution of nicotine, at a temperature not less than about 80° C. and not more than 90° C. and maintaining the mixture at a temperature within said range until condensation takes place, and then separating the solids from the liquids.

4. The method of producing an insecticide material comprising nicotine and the reaction products of resorcinol and formaldehyde, which consists in making an aqueous solution of resorcinol in the proportion by weight of 100 parts of water to 20 parts of resorcinol, separately preparing an aqueous solution of 7 parts by weight of 95% free nicotine in 140 parts of water, then running the two solutions together into 15 parts of an aqueous solution of 37% formaldehyde while maintaining a temperature of about 80° to 90° C., maintaining the mixture at a temperature between these ranges for about one hour and then separately recovering the solids from the liquid.

5. An insecticide comprising the reaction products of resorcinol, an aldehyde and an alkaloid toxic to insects.

6. An insecticide comprising the reaction products of an aldehyde, pyrogallol and an alkaloid toxic to insects.

7. An insecticide comprising the reaction products of nicotine, resorcinol and formaldehyde.

8. An insecticide comprising the reaction products of nicotine, formaldehyde and pyrogallol.

9. An insecticide comprising the reaction products of resorcinol, formaldehyde and nicotine, said nicotine content being about 20% to 25% of the whole.

WARREN MOORE.